(12) United States Patent
Lechler et al.

(10) Patent No.: US 11,746,915 B2
(45) Date of Patent: Sep. 5, 2023

(54) VALVE ASSEMBLY

(71) Applicant: Robert Bosch GmbH, Stuttgart (DE)

(72) Inventors: Andreas Lechler, Moeglingen (DE);
Wolf Stahr, Abstatt (DE); Patrick
Schellnegger, Ludwigsburg (DE);
Joern Kreutzer, Duelmen (DE);
Christoph Eisele, Heilbronn (DE);
Andrej Gardt, Abstatt (DE); Marcus
Biehler, Wuestenrot (DE); Michael
Kloss, Ilsfeld-Auenstein (DE); Felix
Schorn, Renningen (DE)

(73) Assignee: Robert Bosch GmbH, Stuttgart (DE)

( * ) Notice: Subject to any disclaimer, the term of this
patent is extended or adjusted under 35
U.S.C. 154(b) by 79 days.

(21) Appl. No.: 17/600,006

(22) PCT Filed: Feb. 7, 2020

(86) PCT No.: PCT/EP2020/053108
§ 371 (c)(1),
(2) Date: Sep. 29, 2021

(87) PCT Pub. No.: WO2020/200553
PCT Pub. Date: Oct. 8, 2020

(65) Prior Publication Data
US 2022/0178455 A1 Jun. 9, 2022

(30) Foreign Application Priority Data
Apr. 3, 2019 (DE) .................. 10 2019 204 754.8

(51) Int. Cl.
F16K 17/04 (2006.01)
B60T 15/02 (2006.01)
(Continued)

(52) U.S. Cl.
CPC ...... *F16K 17/0433* (2013.01); *F16K 17/0406*
(2013.01); *B60T 15/02* (2013.01);
(Continued)

(58) Field of Classification Search
CPC ......... Y10T 137/7927; Y10T 137/7928; Y10T
137/7929; F16K 17/0406; F16K 17/0433;
F16K 15/042
See application file for complete search history.

(56) References Cited

U.S. PATENT DOCUMENTS 3,693,650 A * 9/1972 MacGuire ............ F02M 23/095
123/585
3,746,038 A * 7/1973 Simmons ................ F02C 7/228
137/513.5
(Continued)

FOREIGN PATENT DOCUMENTS

DE         102 24 430 A1    12/2003
DE    10 2007 023 659 A1    12/2008
(Continued)

OTHER PUBLICATIONS

International Search Report corresponding to PCT Application No. PCT/EP2020/053108, dated May 4, 2020 (German and English language document) (6 pages).

*Primary Examiner* — Robert K Arundale
(74) *Attorney, Agent, or Firm* — Maginot, Moore & Beck LLP

(57) ABSTRACT

The disclosure relates to a valve assembly, comprising a valve body, in which a fluid channel is formed that connects a fluid inlet to a fluid outlet, wherein a preload force is applied to a closing body, which is movably mounted in the fluid channel, in the direction of a valve seat formed in the valve body, a fluid force acting on the closing body against the preload force in order to open the valve seat. The closing body is guided axially and/or radially by at least one guide
(Continued)

ball, the guide ball being arranged between the closing body and a lateral boundary of the fluid channel.

20 Claims, 9 Drawing Sheets

(51) Int. Cl.
*F16K 17/10* (2006.01)
*F16K 15/04* (2006.01)
(52) U.S. Cl.
CPC .......... *F16K 15/042* (2013.01); *F16K 17/105* (2013.01); *Y10T 137/7927* (2015.04)

(56) References Cited

U.S. PATENT DOCUMENTS

| | | | | |
|---|---|---|---|---|
| 5,181,768 | A * | 1/1993 | Wolff | B60T 8/404 |
| | | | | 137/539.5 |
| 5,288,214 | A * | 2/1994 | Fukuda | F04B 43/043 |
| | | | | 137/903 |
| 5,368,556 | A * | 11/1994 | Lecuyer | A61M 27/006 |
| | | | | 604/9 |
| 6,439,263 | B2 * | 8/2002 | Schwegler | F02M 69/54 |
| | | | | 137/539.5 |
| 6,892,758 | B2 * | 5/2005 | Inage | B60T 8/341 |
| | | | | 137/539.5 |
| 2001/0022193 | A1 * | 9/2001 | Schwegler | F02M 69/54 |
| | | | | 137/514 |
| 2001/0042565 | A1 | 11/2001 | Kao et al. | |
| 2002/0079000 | A1 | 6/2002 | Inage et al. | |
| 2005/0031472 | A1 * | 2/2005 | Merz | F02M 55/007 |
| | | | | 417/440 |
| 2018/0105034 | A1 | 4/2018 | Ambrose et al. | |

FOREIGN PATENT DOCUMENTS

| | | |
|---|---|---|
| DE | 10 2008 043 841 A1 | 5/2010 |
| DE | 10 2013 202 588 A1 | 1/2014 |
| DE | 10 2015 217 211 A1 | 3/2017 |
| DE | 10 2015 217 212 A1 | 3/2017 |
| JP | H10-181620 A | 7/1998 |
| JP | 2001-227662 A | 8/2001 |
| JP | 2002-195429 A | 7/2002 |
| JP | 2014-181765 A | 9/2014 |
| WO | 2016/205796 A1 | 12/2016 |

* cited by examiner 12  11,11B 11,11C  12

12  11,11D 12  11,11E

VALVE ASSEMBLY

This application is a 35 U.S.C. § 371 National Stage Application of PCT/EP2020/053108, filed on Feb. 7, 2020, which claims the benefit of priority to Serial No. DE 10 2019 204 754.8, filed on Apr. 3, 2019 in Germany, the disclosures of which are incorporated herein by reference in their entirety.

The disclosure relates to a valve subassembly in accordance with the type of the disclosure.

Known vehicle braking systems having ABS and/or ESP functionality provide additional functions which support the driver, for example, in maintaining distance from the vehicle in front. This occurs as a result of an active engagement of the additional function in the vehicle braking system by pressure being built up on wheel brake calipers without the driver having activated the brake pedal himself. So that the driver does not hear any disruptive noises, hydraulic damping measures which reduce pressure pulses from a conveyor unit of the vehicle braking system are used. The damping measures may be composed of a hydraulic resistance and a capacitance. For the effectiveness of such a hydraulic damper, a significant throttling by means of a hydraulic resistance is used. It may be considered to be disadvantageous in this instance that, with the significant hydraulic resistance and a resultant high pressure drop, the load on the drive of the conveyor unit increases, the speed is reduced and consequently the conveying capacity or the pressure build-up dynamic decreases. As a counter-measure, hydraulic resistances which depending on the throughflow represent a variable flow cross section can be used. Consequently, with large volume flows the flow cross section which is flowed through may become greater and consequently the further increase of the pressure decrease can be reduced.

If variable throttles in the form of a valve whose closure member is loaded, for example, by means of a spring or a magnet, are configured with a stroke which is dependent on throughflow, flow forces which may lead to a translational and rotational oscillation of the closure member are then active. It is thereby possible to produce pressure oscillations which spread in the hydraulic system and which, as a result of the connection of the lines to the body, may lead to noise problems in the passenger compartment.

DE 102 24 430 A1 DE discloses a generic valve subassembly which is configured as a non-return valve and which comprises a housing which has an inlet opening and an outlet opening and in which there is formed an inner space which has a valve seat at the inlet side and in which a closure member whose movement in the opening direction is limited by a stop and on which a valve spring which is active in a closure direction of the non-return valve engages is movably supported. In this instance, the resulting force which acts on the closure member when the non-return valve is opened by the flow has a transverse component with respect to the opening direction. In addition, the closure member is configured in an asymmetrical manner.

It may be considered to be disadvantageous in this instance for the action of the oscillation suppression to be dependent on the flow speed and fluid properties. Consequently, the action can only be achieved for specific temperature ranges and volume flows. A change to another fluid would result in different behavior.

DE 10 2013 202 588 A1 discloses a valve subassembly which comprises a valve housing in which a longitudinal channel which connects a valve inlet to a valve outlet is provided. In the longitudinal channel, there is inserted a closure member which is acted on by a closure spring in the direction of a valve seat which is constructed in the valve housing. In order to avoid the closure member, a hydraulic diaphragm is preferably provided in a parallel circuit with respect to the closure member. In order to damp oscillations of the closure member, either upstream or downstream with respect to the closure member there is arranged in the valve housing a resilient friction element which is received in a frictionally engaging manner between the valve housing and the closure member. The resilient friction element is preferably configured as an O-ring.

It may be considered to be disadvantageous in this instance for the action of the oscillation suppression not to be able to be ensured over the service-life of the vehicle. For instance, abrasion reduces the lateral guiding and geometry changes of the resilient friction element as a result of fluid absorption (swelling) have a negative effect on the opening behavior.

SUMMARY

The valve subassembly having the features of the disclosure has the advantage that oscillations of the closure member as a result of a defined axial and radial guiding of the closure element can be prevented or at least reduced. In addition, the functionality can be maintained over the service-life of the vehicle. Furthermore, embodiments of the valve subassembly according to the disclosure are more cost-effective and simpler to assemble and less dependent on the operating temperature.

Embodiments of the present disclosure provide for a valve subassembly having a valve member in which a fluid channel which connects a fluid inlet to a fluid outlet is constructed. A closure member which is movably supported in the fluid channel is acted on with a pretensioning force in the direction of a valve seat which is constructed in the valve member, wherein in order to open the valve seat a fluid force acts on the closure member counter to the pretensioning force. In this instance, the closure member is axially and/or radially guided by means of at least one guiding ball, wherein the at least one guiding ball is arranged between the closure member and a lateral delimitation of the fluid channel.

In the valve subassemblies known from the prior art, as a result of tolerances, but also as a result of material erosion, the spacing between the damping element and the lateral delimitation of the fluid channel may change. This may lead to a decrease of the guiding or the tensioning or excess pressure of the resilient friction element. In embodiments of the valve subassembly according to the disclosure, however, the at least one guiding ball is automatically re-adjusted. In addition, coaxiality errors or tolerances of the lateral delimitation of the fluid channel can also be compensated for. Consequently, the dimensional requirements placed on the components are smaller, which leads to lower production costs overall. The effect of the radial play compensation and the reduction of the oscillation tendency of the closure member can be adjusted by means of the geometry of the closure member and the guiding balls, and via the pretensioning force. The at least one guiding ball is preferably configured as a steel ball.

Embodiments of the valve subassembly according to the disclosure may, for example, be used as non-return valves or as dynamic throttles in a hydraulic vehicle braking system.

As a result of the measures and developments set out in the disclosure, advantageous improvements of the valve subassembly set out in the disclosure are possible.

It is particularly advantageous for the pretensioning force to act at an angle on the closure member via the at least one guiding ball and to tension the at least one guiding ball with the closure member so that a resultant force on the closure member has an axially active closure component and a transverse component which acts perpendicularly to the closure component.

In an advantageous embodiment of the valve subassembly, as a result of a friction force acting between the at least one guiding ball and the lateral delimitation of the fluid channel, a hysteresis behavior during a closure operation can be predetermined. In this instance, the effective friction force may, for example, be predetermined by means of the number and dimensions of the guiding balls and the configuration of the lateral delimitation of the fluid channel and can be adapted to the respective application.

In another advantageous embodiment of the valve subassembly, the at least one guiding ball can be arranged on a ball holder which is movably guided in the fluid channel. In this instance, the active pretensioning force can act on the at least one guiding ball via the ball holder. The shape of the ball holder can be freely selected in order to prevent a "displacement" of the at least one guiding ball in a downstream direction. When a plurality of guiding balls are used, as a result of the ball holder the resilient force may be distributed over the guiding balls in a more uniform manner. In addition, the ball holder has a radial play for lateral delimitation of the fluid channel and may additionally be rounded on the outer edge in order to prevent tilting. So that the fluid can flow downstream, flow cross sections whose configuration can be freely selected are provided in the ball holder. The ball holder may thus, for example, have at least one passage and/or at least one recess which each form a flow cross section.

In another advantageous embodiment of the valve subassembly, a restoring spring and/or a magnet may provide the pretensioning force. In this instance, the restoring spring may be supported at one end on the ball holder and at the other end on a spring retention member. The spring retention member may, for example, be configured as a retention disk or as a retention cup which can at least partially receive and guide the restoring spring. The spring retention member is preferably pressed into the fluid channel, wherein the pretensioning force of the restoring spring can be predetermined by means of the impression depth of the spring retention member and/or the properties of the restoring spring. When a magnet is used to produce the pretensioning force, this magnet preferably acts on a ferromagnetic ball holder. In this instance, the magnetic force may act alone, in a state supported by a resilient force or also counter to a resilient force.

In another advantageous embodiment of the valve subassembly, the closure member may be configured as a sealing ball or as a sealing bush. In this instance, the closure member is configured with corresponding round portions in such a manner that the radial play compensation with the at least one guiding ball which is arranged downstream is possible. In addition, additional functions, such as a static throttle can be implemented as a bypass in the closure member.

In another advantageous embodiment of the valve subassembly, the closure member may have a sealing region and a guiding continuation. The sealing region may, for example, be configured as a universal ball joint on which the guiding continuation can be formed.

In another advantageous embodiment of the valve subassembly, the guiding continuation may have a round cross section and be configured as a cone or truncated cone or cylinder. Alternatively, the guiding continuation may have a polygonal cross section. In this instance, corresponding chambers may be constructed between outer faces of the guiding continuation and the lateral delimitation of the fluid channel.

In another advantageous embodiment of the valve subassembly, a plurality of guiding balls which axially and/or radially guide the closure member may be arranged in the fluid channel. In this instance, the guiding balls may be arranged in the fluid channel in such a manner that the guiding balls are mutually supported in the peripheral direction. This means that the number of balls is selected in such a manner that they can be mutually supported in the peripheral direction and a non-uniform displacement of the balls can be prevented. It is thereby possible, for example, to prevent all the balls being located on only one side of the closure member.

Alternatively, the guiding balls may be positioned and guided using appropriate means, in a similar manner to a cage with ball bearings. The configuration of the positioning means may be freely selected. The ball holder may thus, for example, have corresponding recesses as positioning means which in each case at least partially receive and position a guiding ball. Via the recesses, the guiding balls may have defined spacings from each other. In addition, the chambers constructed between the outer faces of the guiding continuation and the lateral delimitation of the fluid channel may in each case at least partially receive and position a guiding ball. As a result of a selective configuration of the guiding continuation, a movable positioning of the balls can be brought about. In addition, the positioning means may be configured as axial retention grooves which are introduced into the valve member and which in each case can at least partially receive and position a guiding ball.

In another advantageous embodiment of the valve subassembly, the ball holder may, for example, be configured as a retention ball or as a disk or as a retention capsule or as a retention sleeve. The configuration as a retention ball enables a cost-effective production of the ball holder. The retention capsule may at least partially receive an end of the restoring spring and the restoring spring may be supported on the base of the retention capsule. In addition, the configuration as a retention capsule or retention sleeve enables better guiding in the fluid channel without tilting. Furthermore, an open end of the retention capsule may form with the spring retention member a stop for limiting the opening movement of the closure member. An edge of the retention sleeve facing away from the closure member may form with the spring retention member or an additional stop disk a stop for limiting the opening movement of the closure member.

In another advantageous embodiment of the valve subassembly, a static throttle may form a permanent fluid connection between the fluid inlet and the fluid outlet. The static throttle may, for example, be constructed in the sealing bush or in the valve member.

In another advantageous embodiment of the valve subassembly, the fluid channel may have between the valve seat and the fluid outlet a cylindrical fluid channel portion or a stepped fluid channel portion. Since the transverse force, in addition to the geometry of the closure member, the at least one guiding ball and the pretensioning force, is also dependent on the configuration of the lateral delimitation of the fluid channel, desired valve properties can thereby be enabled. A transition between different cross sections of the stepped fluid channel portion may, for example, have a path which is linear or curved in an opening direction with an increasing or decreasing opening cross section. Alternatively, a transition between different cross sections of the stepped fluid channel portions in an opening direction as far as an inflection point may have a linear or curved path with a decreasing opening cross section and, from the inflection point, a linear or curved path with an increasing opening cross section. In addition, the at least one guiding ball may be arranged in the region of the transition between different cross sections of the stepped fluid channel portion.

Embodiments of the disclosure are illustrated in the drawings and explained in greater detail in the following description. In the drawings, identical reference numerals refer to components or elements which carry out the same or similar functions.

DETAILED DESCRIPTION

Figure 1:
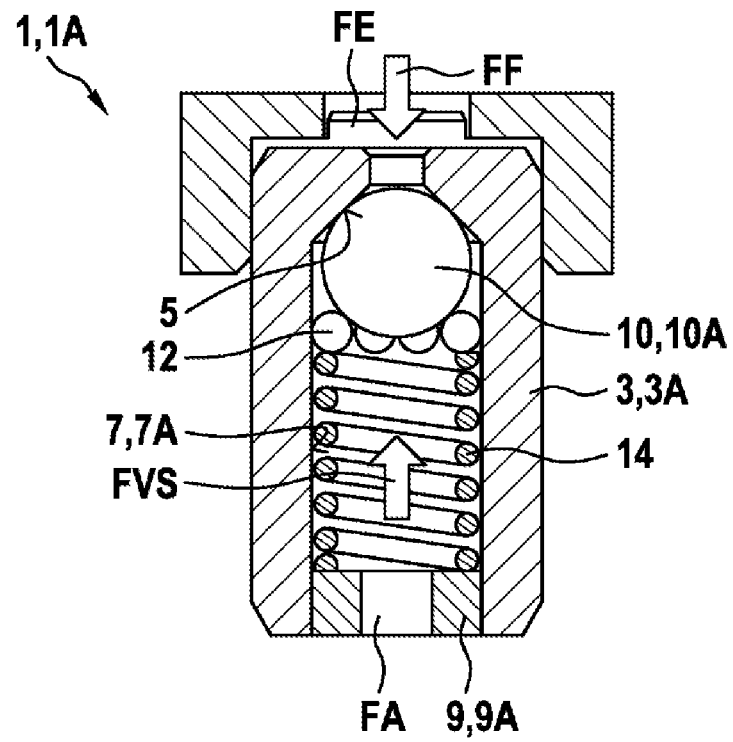
FIG. 1 is a schematic sectioned illustration of a first embodiment of a valve subassembly according to the disclosure in the closed state.

As can be seen in FIGS. 1 to 9, the illustrated embodiments of a valve subassembly 1 according to the disclosure in each case comprise a valve member 3, 3A, 3B, 3C, in which a fluid channel 7 which connects a fluid inlet FE to a fluid outlet FA is constructed. A closure member 10 which is movably supported in the fluid channel 7 is acted on in the direction of a valve seat 5 which is constructed in the valve member 3, 3A, 3B, 3C with a pretensioning force FVS, wherein in order to open the valve seat 5 a fluid force FF acts counter to the pretensioning force FVS on the closure member 10. In this instance, the closure member 10 is axially and/or radially guided by means of at least one guiding ball 12. In addition, the at least one guiding ball 12 is arranged between the closure member 10 and a lateral delimitation of the fluid channel 7.

As can further be seen in FIGS. 1 to 9, the pretensioning force FVS acts via the at least one guiding ball 12 at an angle on the closure member 10 and tensions the at least one guiding ball 12 with the closure member 10 so that a resultant force on the closure member 12 has an axially active closure component and a transverse component which acts perpendicularly relative to the closure component.

As can further be seen in FIGS. 1 to 9, the valve subassembly 1 in the illustrated embodiments is configured in each case as a dynamic throttle 1A, 1B, 1C, 1D, 1E, 1F, 1G, 1H. In the dynamic throttles 1A, 1B, 1C, 1D, 1E, 1F, 1G, 1H illustrated, the stroke of the closure member 10 is adjusted in accordance with the pretensioning force FVS and the fluid force FF. In addition, the valve member 3, 3A, 3B, 3C, in the illustrated embodiments is configured as a hat-like sleeve, wherein the fluid outlet FA is introduced as an opening in the base of the hat-like sleeve and the fluid inlet FE is arranged at the open end of the hat-like sleeve. The valve seat 5 is introduced as a conical seat on the inner edge of the opening in the base of the hat-like sleeve. Of course, the valve seat 5 and/or the valve member 3, 3A, 3B, 3C may also have another suitable shape.

Figure 7:
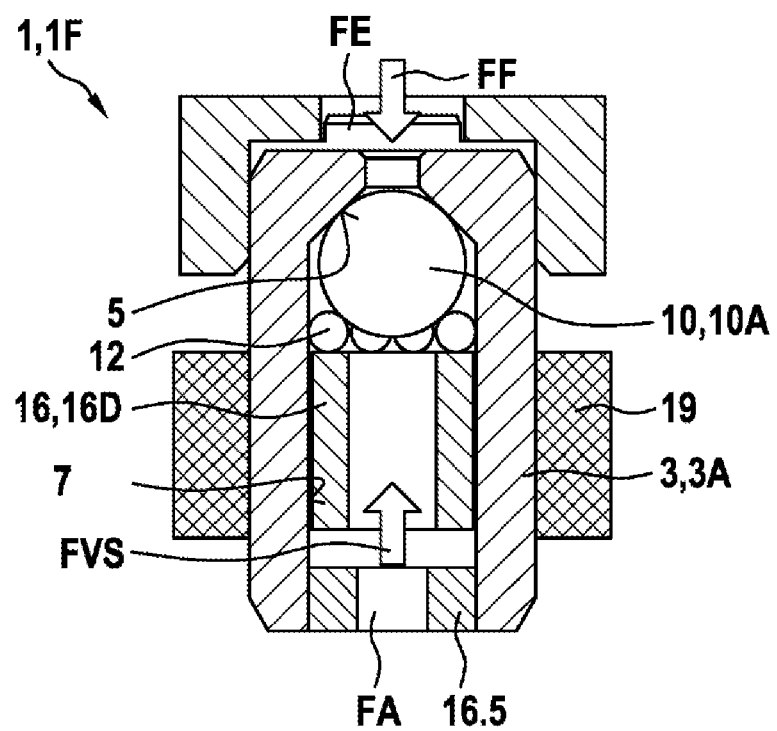
FIG. 7 is a schematic sectioned illustration of a sixth embodiment of a valve subassembly according to the disclosure in the closed state.
Figure 8:
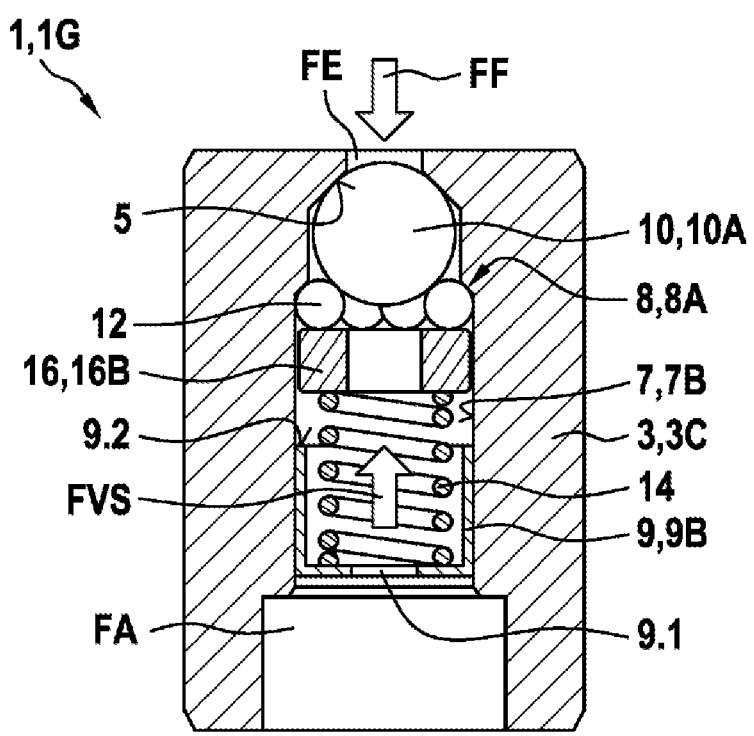
FIG. 8 is a schematic sectioned illustration of a seventh embodiment of a valve subassembly according to the disclosure in the closed state.
Figure 9:
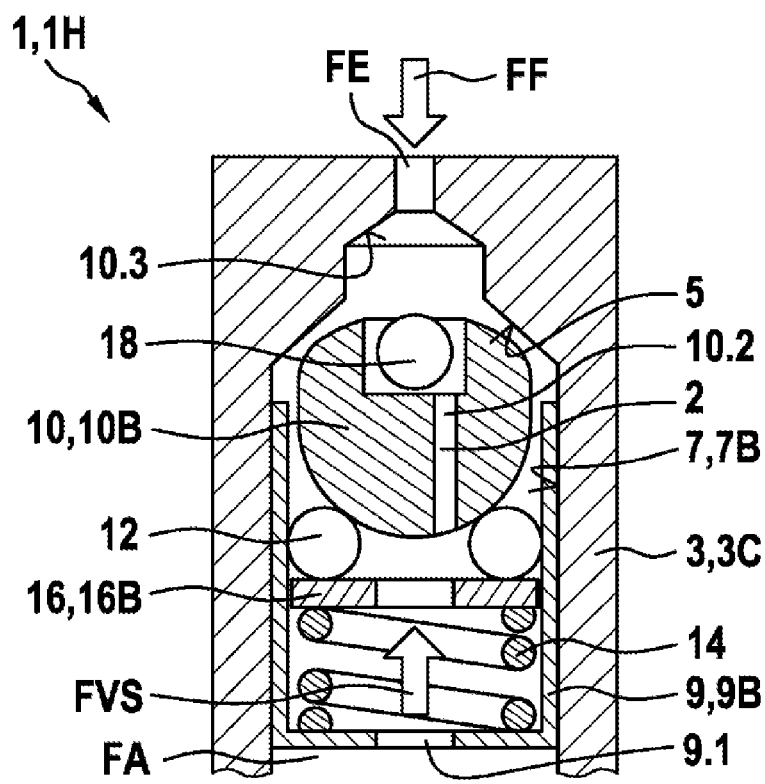
FIG. 9 is a schematic sectioned illustration of an eighth embodiment of a valve subassembly according to the disclosure in the open state.

As can further be seen in FIGS. 1 to 9, in the embodiments illustrated in addition to the closure member 10 which in the embodiments of the valve subassembly 1 illustrated in FIGS. 1 to 8 is configured as a sealing ball 10A and in the embodiment of the valve subassembly 1 illustrated in FIG. 9 is configured as a sealing bush 10B, a plurality of guiding balls 12 are arranged in the fluid channel 7. The number and dimensions of the guiding balls 12 may be freely selected and adapted to the structural space requirements or to the configuration of the closure member 10 and the fluid channel 7. The guiding balls 12 guide the closure member 10 radially and/or axially. Oscillations of the closure member 10 are thereby prevented or at least reduced so that the noise behavior of the valve subassembly 1 is considerably improved. The position of the guiding balls 12 may be distributed freely on the closure member 10. In the embodiments illustrated, the guiding balls 12 are arranged downstream of the closure member 10. As a result of the pretensioning force FVS which is produced in the embodiments illustrated by means of a restoring spring 14 or by means of a magnetic force, the guiding behavior of the guiding balls 12 is improved since the at least one guiding ball 12 is tensioned with the closure member 10. In addition to the axial force transmission, a radial force thereby additionally acts on the guiding balls 12. This radial force counteracts axial and/or radial oscillations of the closure member 10. The action of the radial play compensation and the reduction of the oscillation tendency of the valve subassembly 1 can be adjusted by means of the geometry of the closure member 10 and the guiding balls 12 and the pretensioning force. The guiding balls 12 are preferably configured as steel balls.

As a result of the friction force between the guiding balls 12 and the lateral delimitation of the fluid channel 7, a hysteresis behavior which, in situations with a high desired throughflow, leads to a delayed closure of the valve subassembly 1 can be achieved. The valve subassembly 1 thereby constitutes with sequential pump conveying strokes a reduced fluid resistance.

Figure 2:
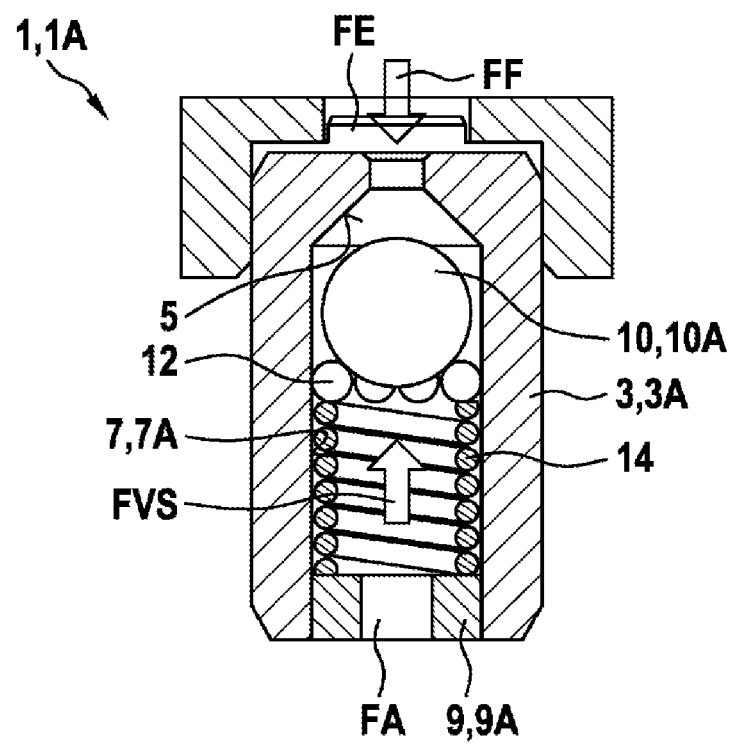
FIG. 2 is a schematic sectioned illustration of the valve subassembly according to the disclosure from FIG. 1 in the open state.

As can further be seen in FIGS. 1 and 2, the valve subassembly 1 or the dynamic throttle 1A comprises in the embodiment illustrated a plurality of guiding balls 12 and a restoring spring 14 which brings about the pretensioning force FVS on the guiding balls 12. As can further be seen in FIGS. 1 and 2, the restoring spring 14 in the embodiment illustrated is configured as a helical spring which is supported at one end on a spring retention member 9 and at the other end on the guiding balls 12. In the embodiment illustrated, the spring retention member 9 is configured as a retention disk 9A with a central passage 9.1 and pressed at the open end of the valve member 3A into the fluid channel 7.

In the closed state of the valve subassembly 1 illustrated in FIG. 1, the active pretensioning force FVS of the restoring spring 14 is greater than the fluid force FF acting externally on the fluid outlet FE so that the pretensioning force FVS of the restoring spring 14 presses the closure member 10 or the sealing ball 10A via the guiding balls 12 into the valve seat 5.

In the open state of the valve subassembly 1 illustrated in FIG. 2, the active pretensioning force FVS of the restoring spring 124 is smaller than the fluid force FF acting externally on the fluid inlet FE so that the fluid force FF presses the closure member 10 or the sealing ball 10A counter to the pretensioning force FVS of the restoring spring 14 out of the valve seat 5. As a result of the guiding balls 12, the closure member 10 or the sealing ball 10A is radially and axially guided during the opening movement or during the closure movement.

As can further be seen in FIGS. 3 to 9, the embodiments of the valve subassembly 1 illustrated comprise a ball holder 16 as an additional component on which the at least one guiding ball 12 is arranged. The ball holder 16 may have different suitable forms and is guided in an axially movable manner with radial play in the fluid channel 7. In addition, the active pretensioning force FVS acts via the ball holder 16 on the at least one guiding ball 12. The ball holder 16 is intended to prevent a downstream "displacement" of the at least one guiding ball 12 and to distribute the pretensioning force FVS in a more uniform manner over the guiding balls 12.

Figure 3:
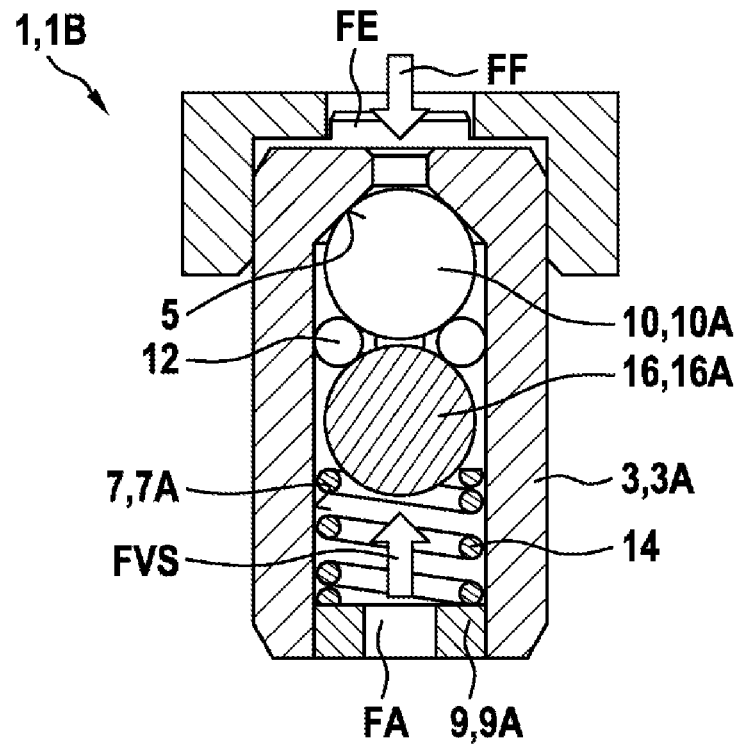
FIG. 3 is a schematic sectioned illustration of a second embodiment of a valve subassembly according to the disclosure in the closed state.

As can further be seen in FIG. 3, the valve subassembly 1 or the dynamic throttle 1B comprises in the embodiment illustrated a plurality of guiding balls 12 and a restoring spring 14 which is configured as a helical spring and which brings about the pretensioning force FVS on the guiding balls 12. As can further be seen in FIG. 3, a ball holder 16 is arranged between the restoring spring 14 and the guiding balls 12. In the embodiment illustrated, the ball holder 16 is configured as a retention ball 16A. In this instance, the restoring spring 14 is supported at one end on a spring retention member 9 which is configured as a retention disk 9A and at the other end on the retention ball 16A. The spring retention member 9 is in the embodiment illustrated configured with a central passage 9.1 and pressed at the open end of the valve member 3A into the fluid channel 7.

Figure 4:
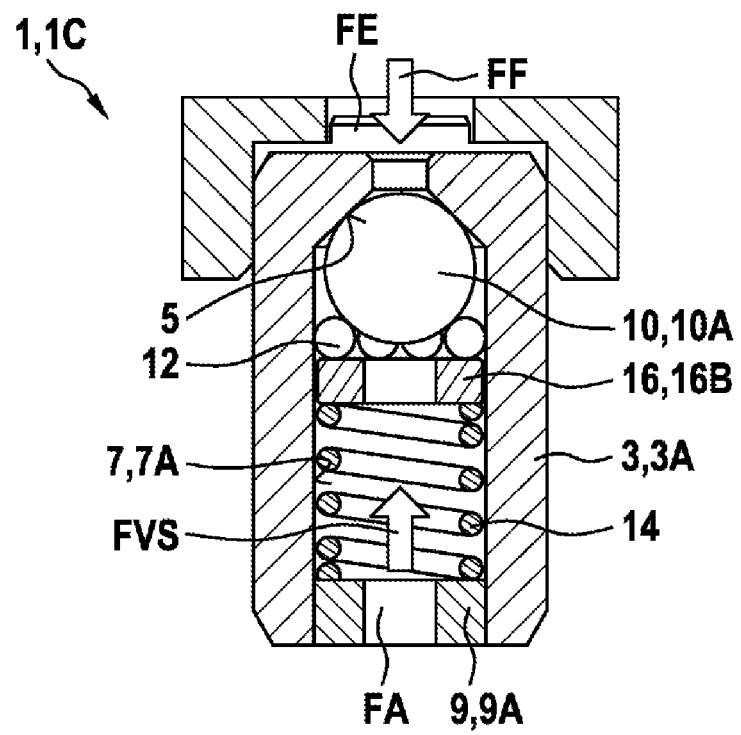
FIG. 4 is a schematic sectioned illustration of a third embodiment of a valve subassembly according to the disclosure in the closed state.
Figure 5:
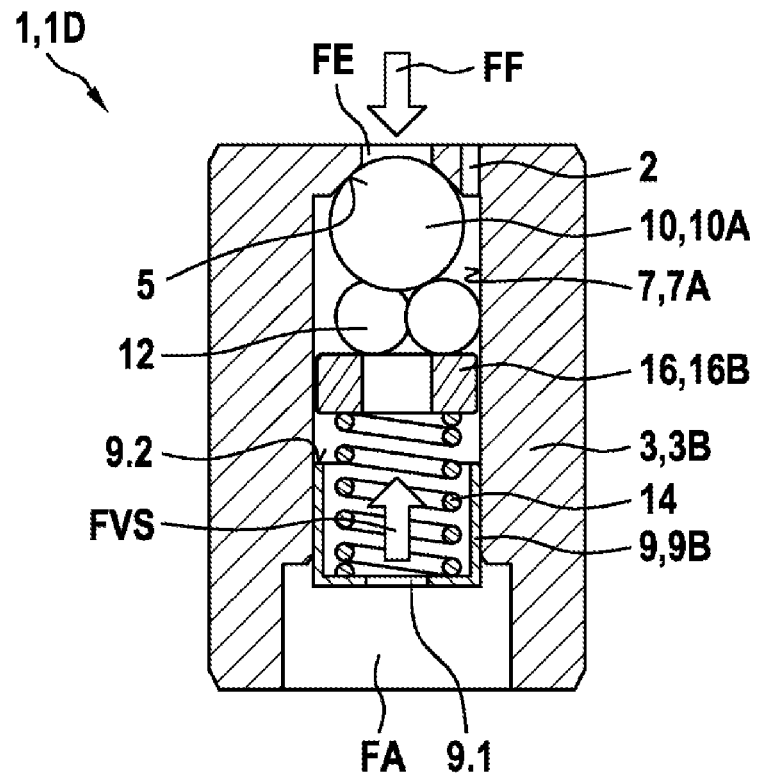
FIG. 5 is a schematic sectioned illustration of a fourth embodiment of a valve subassembly according to the disclosure in the closed state.
Figure 10:
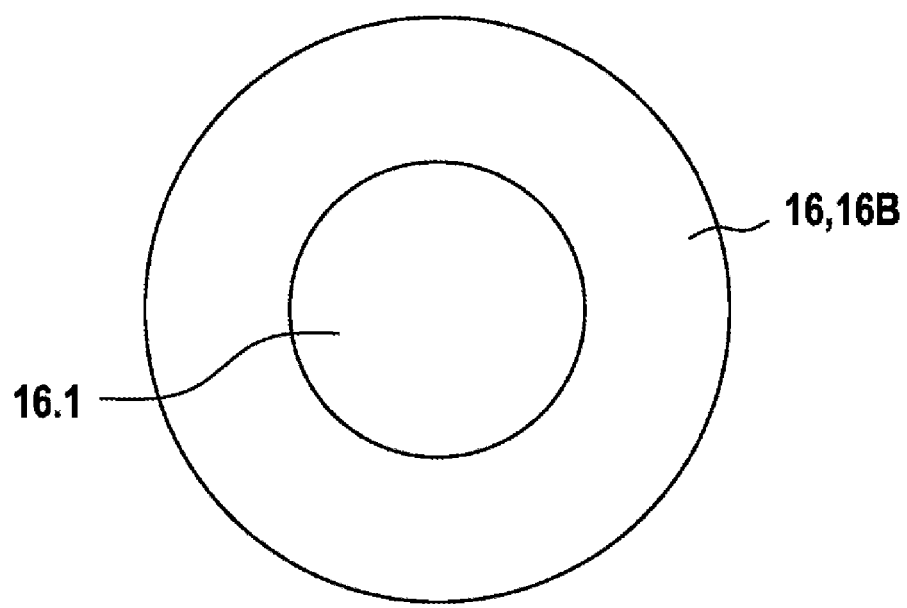
FIGS. 10 to 12 are in each case a schematic plan view of an embodiment of a ball holder for a valve subassembly according to the disclosure.
Figure 11:
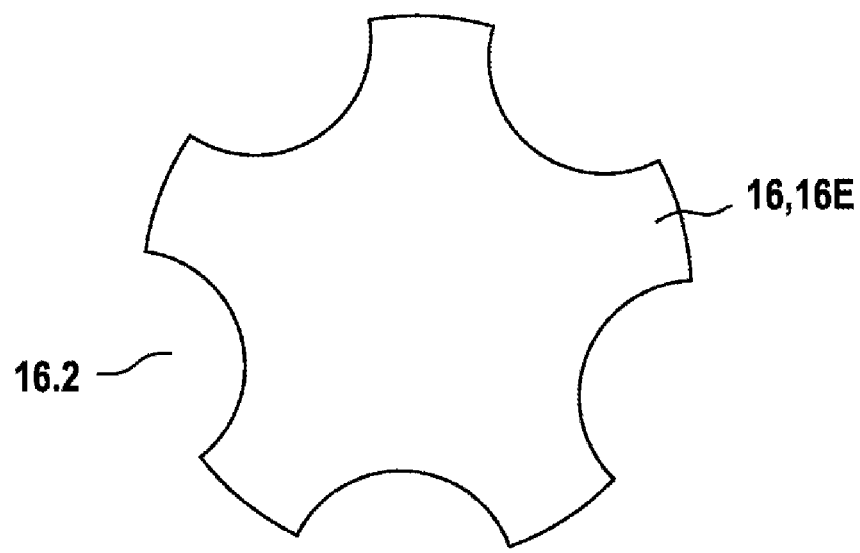

As can further be seen in FIGS. 4 and 5, the valve subassembly 1 or the dynamic throttle 1C, 1D in the embodiments illustrated comprises a plurality of guiding balls 12 and a restoring spring 14 which is configured as a helical spring and which brings about the pretensioning force FVS on the guiding balls 12. As can further be seen in FIGS. 4 and 5, a ball holder 16 is arranged between the restoring spring 14 and the guiding balls 12. In the embodiments illustrated, the ball holder 16 is configured as a disk 16B. The ball holder 16 which is configured as a disk 16B has at least one flow cross section in order in the open state to enable a fluid flow in the fluid channel 7. As can further be seen in FIGS. 10 to 12, the disk 16B, 16E, 16F may have at least one passage 16.1 and/or at least one recess 16.2 which in each case form at least one flow cross section. As can further be seen in FIGS. 4, 5 and 10, the illustrated disk 16B has in each case a central passage 16.1. As can further be seen in FIG. 11, the disk 16E illustrated has a plurality of recesses 16.2 formed on the edge. As can further be seen in FIG. 12, the disk 16F illustrated has a central passage 16.1 and a plurality of recesses 16.2 which are formed on the edge.

As can further be seen in FIG. 4, the restoring spring 14 is supported in the embodiment illustrated at one end on a spring retention member 9 which is configured as a retention disk 9A and at the other end on the ball holder which is configured as a disk 16B. The spring retention member 9 is in the embodiment illustrated configured with a central passage 9.1 and at the open end of the valve member 3A pressed into the fluid channel 7.

As can further be seen in FIG. 5, the spring retention member 9 is in the embodiment illustrated configured as a retention cup 9B which is pressed at the open end of the valve member 3B into the fluid channel 7 and at least partially receives the restoring spring 14. On the base, the retention cup 9B has a central passage 9.1. As can further be seen in FIG. 5, the restoring spring 14 is supported in the embodiment illustrated at one end on the base of the retention cup 9B and at the other end on the disk 16B. In addition, the open end of the retention cup 9B forms a stop 9.2, which limits the opening movement of the closure member 10.

Figure 6:
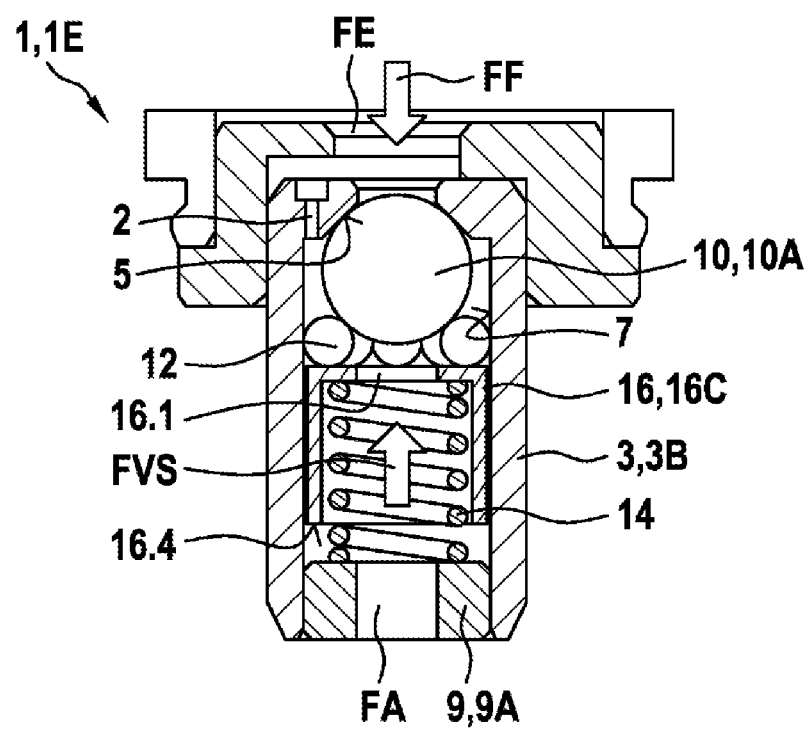
FIG. 6 is a schematic sectioned illustration of a fifth embodiment of a valve subassembly according to the disclosure in the closed state.

As can further be seen in FIG. 6, the valve subassembly 1 or the dynamic throttle 1E comprises in the embodiment illustrated a plurality of guiding balls 12 and a restoring spring 14 which is configured as a helical spring and which brings about the pretensioning force FVS on the guiding balls 12. As can further be seen in Figure 6, a ball holder 16 is arranged between the restoring spring 14 and the guiding balls 12. In the embodiment illustrated, the ball holder 16 is configured as a retention capsule 16C which at least partially receives the restoring spring 14 and which has on the base a central passage 16.1. In this instance, the restoring spring 14 is supported at one end on a spring retention member 9 which is configured as a retention disk 9A and at the other end on the base of the retention capsule 16C. The spring retention member 9 is in the embodiment illustrated configured with a central passage 9.1 and pressed at the open end of the valve member 3B into the fluid channel 7.

As can further be seen in FIGS. 5 and 6, the valve subassembly 1 or the dynamic throttle 1D, 1E in the embodiments illustrated in each case comprises a static throttle 2 which forms a permanent fluid connection between the fluid inlet FE and the fluid outlet FA. As can further be seen in FIGS. 5 and 6, the static throttle 2 is formed in the embodiments illustrated in each case in the base of the valve member 3B which is constructed as a hat-like sleeve.

As can further be seen in FIG. 7, the valve subassembly or the dynamic throttle 1F in the embodiment illustrated comprises a plurality of guiding balls 12 and a magnet sub-assembly 19 which brings about the pretensioning force FVS on the guiding balls 12. As can further be seen in FIG. 7, the ball holder 16 is constructed as a retention sleeve 16D from a ferromagnetic material. In this instance, the restoring spring 14 is supported at one end on a spring retention member 9 which is configured as a retention disk 9A and at the other end on the retention ball 16A. In addition, in the embodiment illustrated, at the open end of the valve member 3A a stop disk 16.5 with a central passage is pressed into the fluid channel 7. The stop disk 16.5 limits the opening movement of the closure member 10.

As can further be seen in FIGS. 1 to 7, the fluid channel 7 of the valve subassembly 1 or the dynamic throttle 1A, 1B, 1C, 1D, 1E, 1F in the embodiments illustrated has in each case between the valve seat 5 and the fluid outlet FA a cylindrical fluid channel portion 7A.

As can further be seen in FIG. 8, the valve subassembly or the dynamic throttle 1G in the embodiment illustrated comprises a plurality of guiding balls 12 and a restoring spring 14 which is configured as a helical spring and which brings about the pretensioning force FVS on the guiding balls 12. As can further be seen in FIG. 8, a ball holder 16 which is configured as a disk 16B and which has a central passage 16.1 is arranged between the restoring spring 14 and the guiding balls 12. As can further be seen in FIG. 8, the spring retention member is configured in the embodiment illustrated as a retention cup 9B which is pressed at the open end of the valve member 3C into the fluid channel 7 and at least partially receives the restoring spring 14. On the base, the retention cup 9B has a central passage 9.1. As can further be seen in FIG. 8, the restoring spring 14 in the embodiment illustrated is supported at one end on the base of the retention cup 9B and at the other end on the disk 16B. In addition, the open end of the retention cup 9B forms a stop 9.2 which limits the opening movement of the closure member 10. As can further be seen in FIG. 8, the fluid channel 7 of the valve subassembly 1 or the dynamic throttle 1G in the illustrated embodiment has, in contrast to the dynamic throttles 1A, 1B, 1C, 1D, 1E, 1F illustrated in FIGS. 1 to 7, a stepped fluid channel portion 7B between the valve seat 5 and the fluid outlet FA.

As can further be seen in FIG. 8, the guiding balls 12 are arranged in the region of a transition 8 between different cross sections of the stepped fluid channel portion 7B. As can be seen in FIGS. 19 to 22, the transition 8 between the various cross sections of the stepped fluid channel portion 7B may have different shapes in order to predetermine a desired valve behavior.

Figure 19:
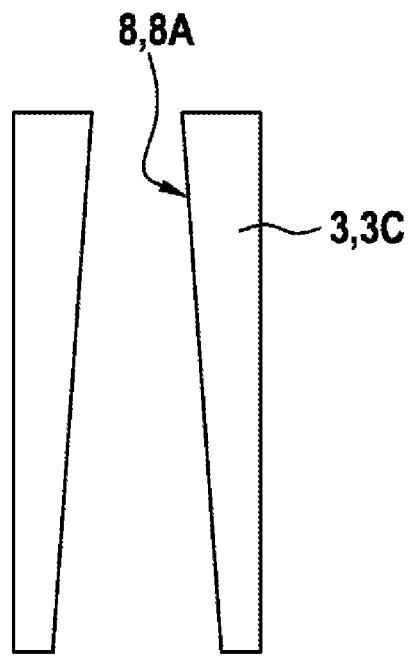

As can further be seen in FIGS. 8 and 19, the transition 8A in the embodiment illustrated has a path which is linear in an opening direction with an increasing opening cross section.

Figure 20:
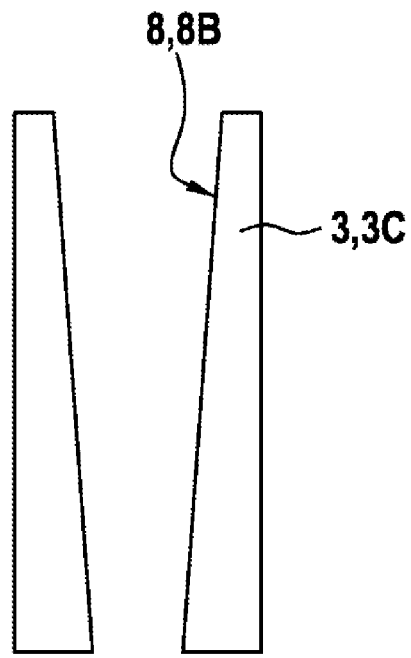

As can further be seen in FIG. 20, the transition 8B has in the embodiment illustrated a path which is linear in an opening direction with a decreasing cross section.

Figure 21:
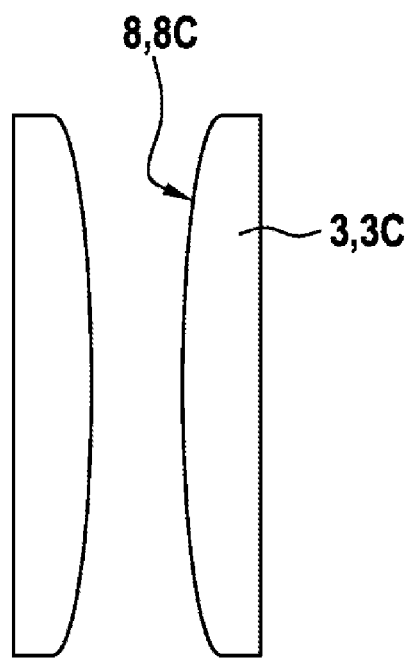

As can further be seen in FIG. 21, the transition 8C has in the embodiment illustrated as far as an inflection point a path which is curved in an opening direction with a decreasing opening cross section and from the inflection point a curved path with an increasing opening cross section.

Figure 22:
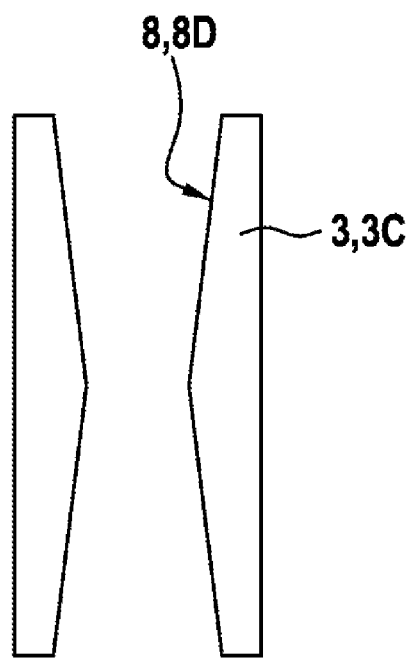

As can further be seen in FIG. 22, the transition 8D has in the embodiment illustrated as far as an inflection point a path which is linear with a decreasing cross section and from the inflection point a linear path with an increasing opening cross section.

As can further be seen in FIG. 9, the valve subassembly 1 or the dynamic throttle 1H comprises in the embodiment illustrated a plurality of guiding balls 12 and a restoring spring 14 which is configured as a helical spring and which brings about the pretensioning force FVS on the guiding balls 12. As can further be seen in FIG. 9, a ball holder 16 which is configured as a disk 16B with a central passage 16.1 is arranged between the restoring spring 14 and the guiding balls 12. As can further be seen in FIG. 9, the spring retention member in the embodiment illustrated is configured as a retention cup 9B which is pressed at the open end of the valve member 3C into the fluid channel 7. In contrast to the previously described embodiments, the retention cup 9B in the embodiment illustrated receives the restoring spring 14, the ball holder 16 and the guiding balls 12 completely and the closure member 10 at least partially. The retention cup 9B has a central passage 9.1 on the base. As can further be seen in FIG. 9, the restoring spring 14 is supported in the embodiment illustrated at one end on the base of the retention cup 9B and at the other end on the disk 16B. As can further be seen in FIG. 9, the fluid channel 7 has a stepped fluid channel portion 7B between a valve seat 10.3 which is constructed on the fluid inlet FE and the fluid outlet FA.

As can further be seen in FIG. 9, at the transition between different cross sections of the stepped fluid channel portion 7B there is constructed another valve seat 5 which cooperates with a closure member 10 which is configured as a sealing bush 10B. As can further be seen in FIG. 9, the closure member 10 which is configured as a sealing bush 10B has a recess and a static throttle 2. In the illustrated opened state of the valve subassembly or the dynamic throttle 1H, there is arranged in the recess another closure member 18 which is configured as a ball and which cooperates in a sealing manner with the valve seat 10.3 which is arranged on the fluid inlet FE when, in the closed state of the valve subassembly 1 or the dynamic throttle 1H via the static throttle 2, an undesirable counter-flow from the fluid outlet FA to the fluid inlet FE is built up. As can further be seen in FIG. 9, the static throttle 2 is arranged eccentrically in the sealing bush 10B and forms a permanent fluid connection between the fluid inlet FE and the fluid outlet FA, which, as a result of the eccentric arrangement, cannot be closed by the additional closure member 18.

Figure 14:
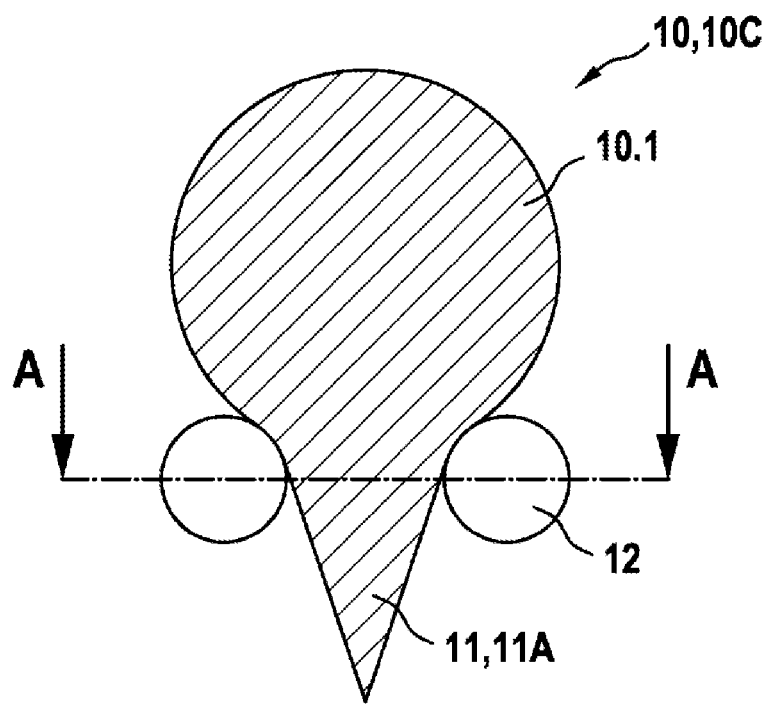
FIG. 14 is a schematic sectioned illustration of an embodiment of a closure member for a valve subassembly according to the disclosure.

In addition to the described configuration as a sealing ball 10A or sealing bush 10B, other embodiments for the closure member 10 are also possible, as can be seen in FIG. 14.

In the embodiment illustrated in FIG. 14, the closure member 10C has a sealing region 10.1 and a guiding continuation 11. In this instance, the sealing region 10.1 in the illustrated embodiment is configured as a universal ball joint on which the guiding continuation 11 is formed. In the embodiment illustrated, the guiding continuation 11 has a round cross section and is constructed as a cone 11A. Alternatively, the guiding continuation 11 with a round cross section may also be configured as a truncated cone or cylinder.

Figure 15:
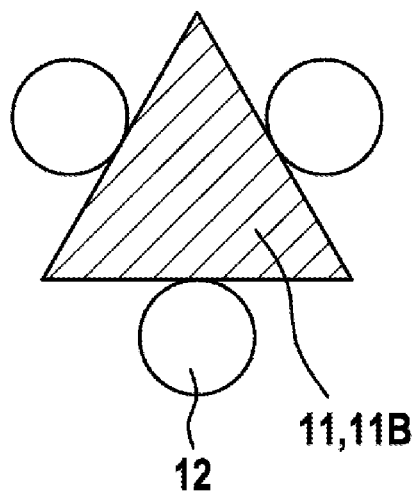
FIGS. 15 to 18 are in each case a schematic cross section of an embodiment of a guiding continuation for the closure member from FIG. 14, FIGS. 19 to 22 are in each case a schematic longitudinal section of an embodiment of a transition between different cross sections of a stepped fluid channel for a valve subassembly according to the disclosure.
Figure 16:
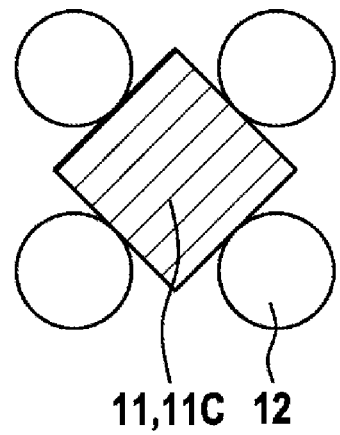
Figure 17:
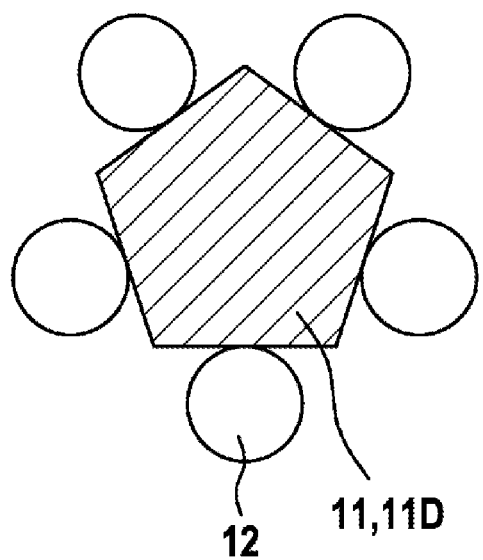
Figure 18:
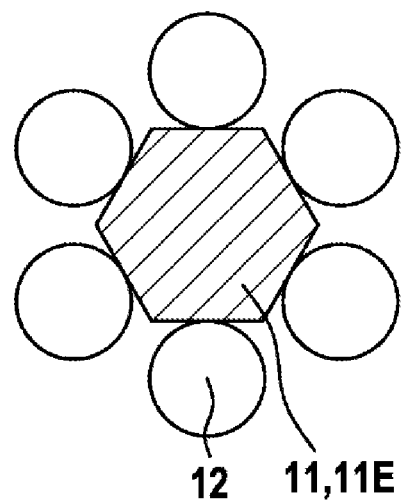

As can further be seen in FIGS. 15 to 18, the guiding continuation 11 may have a polygonal cross section. FIG. 15 shows a guiding continuation 11B having an equilateral triangular cross section. FIG. 16 shows a guiding continuation 11C with a square cross section. FIG. 17 shows a guiding continuation 11D with a regular pentagonal cross section. FIG. 18 shows a guiding continuation 11E with a regular hexagonal cross section. In this instance, corresponding chambers are formed between outer faces of the guiding continuation 11 and the lateral delimitation of the fluid channel 7.

Figure 12:
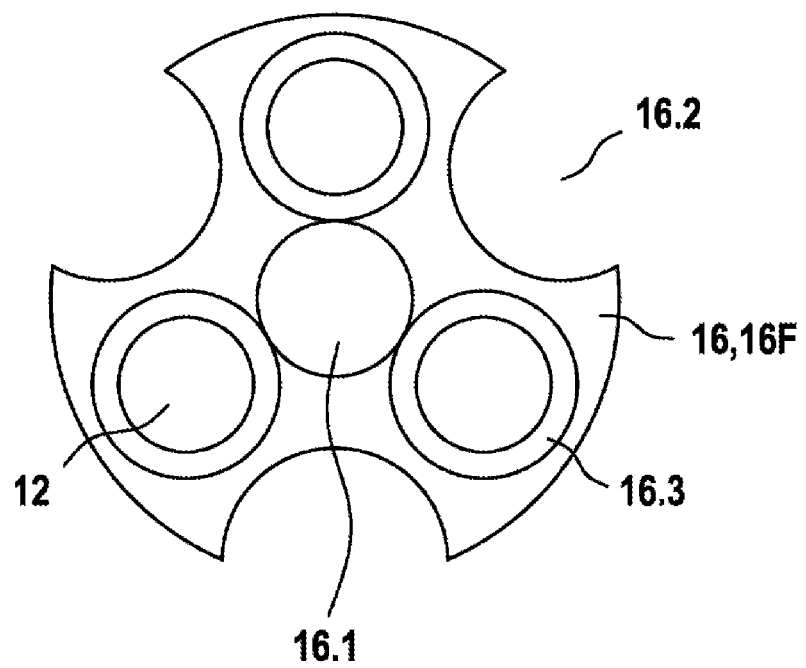
Figure 13:
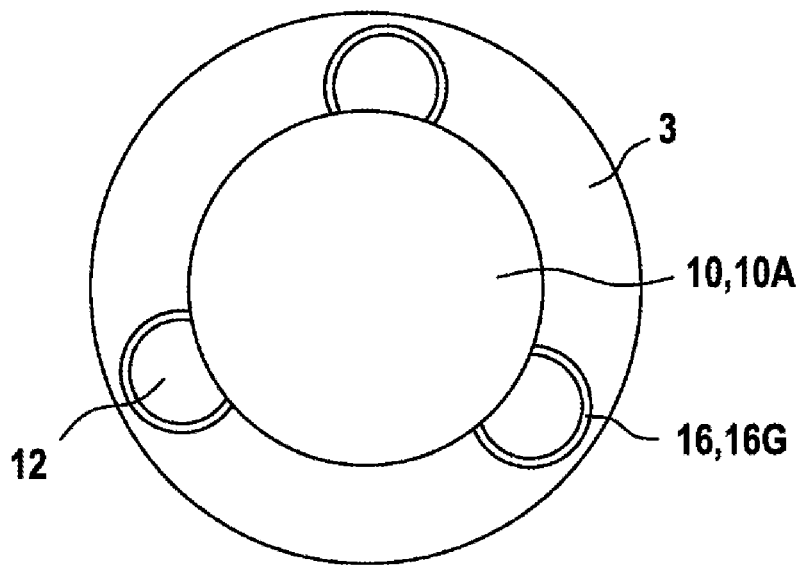
FIG. 13 is a cross section of a valve member for a valve subassembly according to the disclosure with an additional embodiment of a ball holder.

In the embodiments described above, the number of guiding balls 12 which are arranged in the fluid channel 7 is selected in such a manner that the guiding balls 12 are mutually supported in a peripheral direction. Alternatively, positioning means which in each case at least partially receive and position a guiding ball 12 may be provided. The disk 16F which is illustrated in FIG. 12 thus has three recesses 16.3 as positioning means which in each case at least partially receive and position a guiding ball 12. As can further be seen in FIG. 13, the positioning means in the embodiment illustrated are configured as axial retention grooves 16D which are introduced into the valve member 3 and which in each case at least partially receive and position a guiding ball 12. In the embodiment illustrated, three retention grooves 16G are introduced into the valve member 3.

As can further be seen in FIGS. 15 to 18, the chambers which are constructed between outer faces of the guiding continuation 11 and the lateral delimitation of the fluid channel 7 position and at least partially receive a guiding ball 12 in each case. As a result of the guiding continuation 11B illustrated in FIG. 15, three guiding balls 12 are thus positioned. As a result of the guiding continuation 11C illustrated in FIG. 16, four guiding balls 12 are positioned and, as a result of the guiding continuation 11D illustrated in FIG. 17, five guiding balls 12 are positioned and, as a result of the guiding continuation 11E illustrated in FIG. 18, six guiding balls 12 are positioned.

The invention claimed is:

1. A valve subassembly comprising: a valve member in which a fluid channel which connects a fluid inlet to a fluid outlet is constructed, wherein: a closure member which is movably supported in the fluid channel is acted on with a pretensioning force in the direction of a valve seat which is constructed in the valve member such that in order to open the valve seat a fluid force acts on the closure member counter to the pretensioning force: the closure member is at least one of axially and radially guided by a plurality of guiding balls; and the plurality of guiding balls are arranged between the closure member and a lateral delimitation of the fluid channel and in a common plane extending across the fluid channel.

2. The valve subassembly as claimed in claim 1, wherein the pretensioning force acts at an angle on the closure member via the plurality of guiding balls and tensions the plurality of guiding balls with the closure member so that a resultant force on the closure member has an axially active closure component and a transverse component which acts perpendicularly to the closure component.

3. The valve subassembly as claimed in claim 1, wherein, as a result of a friction force acting between the plurality of guiding balls and the lateral delimitation of the fluid channel, a hysteresis behavior during a closure operation is predetermined.

4. The valve subassembly as claimed in claim 1, wherein: the plurality of guiding balls are arranged on a ball holder which is movably guided in the fluid channel; and the active pretensioning force acts on the plurality of guiding balls via the ball holder.

5. The valve subassembly as claimed in claim 4, wherein the ball holder has at least one of at least one passage and at least one recess which each form a flow cross section.

6. The valve subassembly as claimed in claim 1, wherein at least one of a restoring spring and a magnet subassembly provides the pretensioning force.

7. The valve subassembly as claimed in claim 6, wherein the restoring spring is supported at one end on a ball holder and at the other end on a spring retention member.

8. The valve subassembly as claimed in claim 7, wherein the spring retention member is configured as one of a retention disk and a retention cup, and which at least partially receives and guides the restoring spring.

9. The valve subassembly as claimed in claim 6, wherein:
the valve subassembly includes the magnet subassembly; and
the magnet subasssembly acts on a ferromagnetic ball holder.

10. The valve subassembly as claimed in claim 1, wherein the closure member is configured as one of a sealing ball and a sealing bush.

11. The valve subassembly as claimed in claim 1, wherein the closure member has a sealing region and a guiding continuation.

12. The valve subassembly as claimed in claim 11, wherein the sealing region is configured as a universal ball joint on which the guiding continuation is formed.

13. The valve subassembly as claimed in claim 11, wherein the guiding continuation has a round cross section and is configured as one of a cone, a truncated cone, and a cylinder.

14. The valve subassembly as claimed in claim 1, wherein the plurality of guiding balls are arranged in the fluid channel such that the plurality of guiding balls are mutually supported in a peripheral direction.

15. The valve subassembly as claimed in claim 14, wherein the plurality of guiding balls are retained in a positioning mechanism.

16. The valve subassembly as claimed in claim 15, wherein:
the positioning mechanism means comprises a ball holder; and
the ball holder has corresponding recesses which in each case at least partially receive and position a corresponding one of the plurality of guiding ball.

17. The valve subassembly as claimed in claim 15, wherein the closure member has a sealing region and a guiding continuation with a polygonal cross section, the valve subassembly further comprising:
chambers which are constructed between outer faces of the guiding continuation and the lateral delimitation of the fluid channel and in each case at least partially receive and position a guiding channel.

18. The valve subassembly as claimed in claim 15, wherein the positioning mechanism comprises axial retention grooves which are introduced into the valve member and which in each case at least partially receive and position a guiding ball of the plurality of guiding balls.

19. The valve subassembly as claimed in claim 4, wherein the ball holder is configured as one of:
a retention ball;
a disk;
a retention capsule which at least partially receives an end of the restoring spring with the restoring spring supported on the base of the retention capsule, wherein an open end of the retention capsule forms with the spring retention member a stop for limiting the opening movement of the closure member; and
a retention sleeve.

20. The valve subassembly as claimed in claim 1, wherein: a static throttle forms a permanent fluid connection between the fluid inlet and the fluid outlet; the static throttle is constructed in a sealing bush or in the valve member; the fluid channel has between the valve seat and the fluid outlet a stepped fluid channel portion; a transition between different cross sections of the stepped fluid channel portion has in the opening direction as far as an inflection point a linear or curved path with a decreasing opening cross section and, from the inflection point, a linear or curved path with an increasing opening cross section; and the plurality of guiding balls are arranged in the region of the transition between different cross sections of the stepped fluid channel portion.

\* \* \* \* \*

UNITED STATES PATENT AND TRADEMARK OFFICE
CERTIFICATE OF CORRECTION

PATENT NO. : 11,746,915 B2
APPLICATION NO. : 17/600006
DATED : September 5, 2023
INVENTOR(S) : Lechler et al.

It is certified that error appears in the above-identified patent and that said Letters Patent is hereby corrected as shown below:

In the Claims

In Claim 16, at Column 12, Line 28: "the positioning mechanism means comprises" should read --the positioning mechanism comprises--.

Signed and Sealed this
Twenty-eighth Day of November, 2023

Katherine Kelly Vidal
*Director of the United States Patent and Trademark Office*